US005597865A

United States Patent [19]
Jackson

[11] Patent Number: 5,597,865
[45] Date of Patent: Jan. 28, 1997

[54] ADHESIVE BLENDS FOR POLYSTYRENE

[75] Inventor: Paul H. Jackson, Loveland, Ohio

[73] Assignee: Quantum Chemical Corporation, Cincinnati, Ohio

[21] Appl. No.: 342,889

[22] Filed: Nov. 21, 1994

[51] Int. Cl.$^6$ .......................... C08L 31/04; C08L 33/06; C08L 51/06; C08L 53/02
[52] U.S. Cl. .................. 525/71; 525/74; 525/78; 525/80
[58] Field of Search .................. 525/74, 71, 78, 525/80

[56] References Cited

U.S. PATENT DOCUMENTS

| 3,994,439 | 11/1976 | Van Breen et al. | 239/54 |
|---|---|---|---|
| 4,308,353 | 12/1981 | Saito et al. | 525/74 |
| 4,576,995 | 3/1986 | Nakabayshi et al. | 525/285 |
| 4,578,429 | 3/1986 | Gergen et al. | 525/291 |
| 4,628,072 | 12/1986 | Shiraki et al. | 525/57 |
| 4,644,034 | 2/1987 | Tanaka et al. | 525/68 |
| 4,647,620 | 3/1987 | Doak | 525/71 |
| 4,800,216 | 1/1989 | Eichenauer et al. | 525/285 |
| 4,839,422 | 6/1989 | McElrath et al. | 525/74 |
| 4,861,677 | 8/1989 | Lee | 428/516 |
| 4,868,245 | 9/1989 | Pottick et al. | 525/98 |
| 4,904,728 | 2/1990 | George | 525/64 |
| 4,906,687 | 3/1990 | Modic | 525/57 |
| 4,977,014 | 12/1990 | Mitchell et al. | 428/220 |
| 4,994,508 | 2/1991 | Shiraki et al. | 525/74 |
| 5,034,449 | 7/1991 | Mallikarjun | 524/504 |
| 5,070,143 | 12/1991 | Pucci et al. | 525/74 |
| 5,098,105 | 3/1992 | Sullivan | 273/235 R |
| 5,210,135 | 5/1993 | Eichenauer et al. | 525/71 |
| 5,210,136 | 5/1993 | Miller et al. | 525/74 |
| 5,225,482 | 7/1993 | Nakagawa et al. | 525/71 |
| 5,246,523 | 9/1993 | Minnick et al. | 156/306.6 |
| 5,248,367 | 9/1993 | Minnick et al. | 156/306.6 |
| 5,248,368 | 9/1993 | Minnick et al. | 156/306.6 |
| 5,248,369 | 9/1993 | Minnick et al. | 156/306.6 |
| 5,248,373 | 9/1993 | Minnick et al. | 156/306.6 |
| 5,274,035 | 12/1993 | Chundury | 525/92 |
| 5,281,663 | 1/1994 | Gelles et al. | 525/64 |

OTHER PUBLICATIONS

Encyclopedia of Polymer Science and Engineering (John Wiley & Sons, New York, 1989), vol. 16, pp. 88–97.

*Primary Examiner*—Mark Warzel
*Attorney, Agent, or Firm*—Gerald A. Baracka; William A. Heidrich

[57] ABSTRACT

Adhesive blends having special utility in the formation of composite structures with LDPE, EVOH, and impact-modified polystyrene comprise a mixture of an ethylene/ester copolymer such as EVA, polystyrene, such as impact-modified polystyrene, and a functionalized SEBS block copolymer.

10 Claims, No Drawings

ADHESIVE BLENDS FOR POLYSTYRENE

BACKGROUND OF THE INVENTION

1. Field of the Invention

The invention relates generally to adhesive blends and composite structures made therefrom and, more particularly, the invention relates to adhesive blends useful in adhering to polyolefin, polar and polystyrene substrates useful in food packaging and related applications.

2. Description of Background Technology

There has long been a perceived need for laminate structures comprising one or more of a food contact or sealing layer, a barrier layer, and a structural layer for use in the packaging and storage of food. Food contact/sealing layers often comprise non-polar polyolefins such as low density polyethylene (LDPE), for example, while typical barrier layers comprise substrates of polymers such as ethylene vinyl alcohol (EVOH), for example. Structural layers may comprise styrene polymers, which may contain rubber. High impact polystyrene (HIPS) is especially attractive as a structural layer, given its attractive physical properties, ease of extrusion processing, thermoforming, and cutting.

Such composite structures are useful as semi-rigid food packaging (e.g. thermoformed cups) or cast or blown film useful for packaging meat or cheese. Another application is in the fabrication of refrigerator liners that must form a good barrier against hydrohalocarbon blowing agent penetration that can lead to loss of refrigerant and solvent induced stress loading of various polymers.

It is desirable to form such structures by coextrusion or another method wherein a tie layer of adhesive is sandwiched between adjacent, often diverse substrates. Given the diversity of substrates useful in a laminate structure, however, one problem in the past has been to provide an adhesive tie layer which gives acceptable adhesion to each of the substrates present in the structure while being easily processable (i.e., thermoformable, readily die cut, etc.) without permanently changing form after thermoforming. For example, some adhesives remains soft or stringy after thermoforming, compromising the ease of processing by die cutting.

Adhesives useful in this type of composite structure must also be approved by the U.S. Food and Drug Administration or the European Economic Community regulatory authority which approves such materials for use in food packaging.

SUMMARY OF THE INVENTION

It is an object of the invention to overcome one or more of the problems described above.

According to the invention, an adhesive blend useful in adhering to a wide variety of substrates including non-polar polyolefins, polar substrates, and polystyrene is formed from a mixture of an ethylene/ester copolymer, polystyrene, and a functionalized styrene/rubber containing copolymer. In a preferred form, the adhesive blend comprises a mixture of an ethylene/vinyl acetate copolymer, impact-modified polystyrene, and a grafted SEBS block copolymer.

The invention also provides composite structures comprising the inventive adhesive blend adhered to one or more substrates.

Other objects and advantages of the invention will be apparent to those skilled in the art from a review of the following detailed description taken in conjunction with the appended claims.

DETAILED DESCRIPTION OF THE INVENTION

The adhesive blends of the invention generally comprise mixtures of an ethylene/ester copolymer, polystyrene, and a functionalized SEBS block copolymer. The adhesive blends can contain fillers, stabilizers, antioxidants, colorants, etc. or other additional components such as SEBS, SBS, or SIS elastomers or styrene-rubber materials, which may act as compatiblizers to enhance adhesion characteristics.

In various forms, the inventive adhesive blends may consist essentially of or consist of the three essential components identified above, exclusive of antioxidant packages or other additives.

The ethylene/ester copolymer component may comprise a copolymer of ethylene with any of the wide variety of esters such as vinyl acetate or acrylates such as methyl acrylate and n-butyl acrylate, for example. Preferably, the ethylene/ester copolymer comprises an ethyl/vinyl acetate (EVA) copolymer comprising about 5 wt. % to about 40 wt % vinyl acetate, preferably about 18 wt. % to about 28 wt. % vinyl acetate. High levels of vinyl acetate are preferred; 28% vinyl acetate EVAs are particularly preferred. An example of a commercially available EVA suitable for use in the invention is that sold by Quantum Chemical Company (Cincinnati, Ohio) under the trade designation UE 634-04. This product contains about 28 wt. % vinyl acetate.

The polystyrene component may be grafted or ungrafted, and may comprise any of a variety of crystalline polystyrenes or so-called impact-modified polystyrenes such as those conventionally referred to as "high impact" polystyrenes ("HIPS"). Impact-modified polystyrene is preferred.

Preferably, the polystyrene is impact-modified by an elastomer such as a polybutadiene elastomer or a polybutadiene-styrene elastomer. It can be prepared by post-reactor blending of the polystyrene and elastomer components, or by in situ polymerization of styrene monomer and an unsaturated rubber (e.g., polybutadiene or styrene-butadiene elastomer). In the latter case, a physical blend and graft copolymers of the components may be present. Generally, the polystyrene is a high molecular weight polymer, having a molecular weight greater than about 50,000.

The synthesis and characterization of high impact polystyrene is described in detail in *Encyclopedia of Polymer Science and Engineering* (John Wiley & Sons, New York, 1989), Vol. 16, pp. 88–97, the disclosure of which is hereby incorporated by reference.

Typically, useful HIPS materials will have a melt index as measured according to ASTM D-1238, Condition G (200° C., 5000 g) of about 0.5 g/10 min to about 12 g/10 min and highly-preferably about 2 g/10 min to about 4 g/10 min. Preferably, the notched Izod impact (73° F.) of such materials according to ASTM D-256 will be greater than 0.5 ft-lb/in and highly preferably greater than about 1.5 ft-lb/in.

A particularly preferred HIPS material is available from Mobil under the trade designation Mobil 7100 impact-modified polystyrene. Other useful HIPS materials include Huntsman PS730 rubber modified polystyrene, BASF PS 4600 impact resin, and Dow STYRON 484 HIPS.

The third essential component of the inventive adhesive blend is a functionalized styrene-ethylene/butylene-styrene (SEBS) block copolymer, which comprises an SEBS backbone modified with acid or derivative functional groups.

The SEBS backbone can be described as a partially hydrogenated styrene-butadiene-styrene polymer or, alternatively, a block copolymer of styrene and an aliphatic middle block, preferably, an "ABA" copolymer in which the "A" blocks are polystyrene and the "B" or middle block is an aliphatic polymer such as homopolymers or copolymers of butadiene, hydrogenated butadiene, isoprene, or hydrogenated isoprene. Such copolymers typically contain from about 20 wt. % to about 40 wt. % polystyrene end blocks and from about 60 wt. % to about 80 wt. % of the middle block.

The functionalized SEBS block copolymer is preferably an SEBS block copolymer grafted with an acid compound or derivative grafting monomer, such as an ethylenically unsaturated carboxylic acid, anhydride, or other derivative. Grafting may be effected by blending the grafting monomer and the block copolymer in an extruder or other mixer or in solvent dispersion, along with a reaction initiator, such as an organic peroxide.

Typically, the grafted block copolymer comprises up from about 0.02 wt. % to about 20 wt. %, preferably about 0.1 wt. % to about 10 wt. %, and highly preferably about 0.2 wt. % to about 5 wt. % grafted monomer. Functionalized block copolymers containing about 1 wt. % to about 2 wt. % grafted maleic anhydride grafting monomer are preferred. Such materials are commercially available from Shell Chemical Company under the trade designation KRATON® FG copolymers. A particularly preferred functionalized SEBS copolymer is KRATON® FG 1901X maleated rubber containing about 2 wt. % grafted maleic anhydride (measured as succinic anhydride groups). KRATON® FG 1924X maleated rubber contains about 1 wt. % grafted maleic anhydride and is also useful. KRATON® FG 1921X grafted thermoplastic rubber is also believed to be a commercially available useful material.

KRATON® FG 1901X grafted thermoplastic rubber is believed to contain about 28 wt. % styrene and about 72% ethylene/butylene rubber.

Useful functionalized SEBS copolymer materials (including grafting monomers and backbone polymers) and methods for the preparation thereof are further described in Pucci et al. U.S. Pat. No. 5,070,143 (Dec. 3, 1991) and Gergen et al. U.S. Pat. No. 4,578,429 (Mar. 25, 1986), the respective disclosures of which are hereby incorporated by reference.

The adhesive blends of the invention may be prepared by physically mixing the three essential components plus any additional components or additives by any convenient means. Mixing in a Banbury mixer is an especially convenient preparation method.

Typically, the adhesive blends will contain (on a three-component basis) about 40 wt. % to about 99 wt. % ethylene/ester copolymer, about 1 wt. % to about 60 wt. % polystyrene component, and about 0.5 wt. % to about 25 wt. % functionalized SEBS copolymer. Preferably, the adhesive blends will comprise about 60 wt. % to 80 wt. % ethylene/ester copolymer, about 20 wt. % to about 40 wt. % ungrafted polystyrene, and about 4 wt. % to about 16 wt. % functionalized SEBS rubber. A particularly preferred adhesive blend comprises about 68 wt. % EVA containing about 28 wt. % vinyl acetate, about 22 wt. % HIPS, and about 10 wt. % KRATON® FG 1901X maleated rubber, along with an antioxidant package.

The blends of the invention find utility in forming composite structures by adhering a layer of the adhesive to one or more substrates by any convenient means, and by coextrusion in particular. Substrates of particular interest include non-polar polyolefins such as low density polyethylene (LDPE), for example, polar substrates such as ethylene vinyl alcohol (EVOH), for example, and any of the wide variety of styrene polymers, including homopolymers and copolymers. The styrene polymers may but need not necessarily be modified by the inclusion of an elastomer. Impact-modified polystyrene substrates are of particular interest due to their utility as structural layers in multilayer laminate structures. Useful substrates include those formed from the family of styrene-butadiene copolymers sold under the trade designation "K-RESIN" by Phillips 66 Company.

One advantage of the invention is its excellent adhesion under a variety of conditions to non-polar polyolefins, polar polymers and other polar substrates, polystyrene substrates, and to polyethylene (e.g., LLDPE, VLDPE, LDPE, MDPE, and HDPE), EVOH, and HIPS substrates in particular. The composite structures are easily formed, and can be readily die cut even after thermoforming. Each of the constituents of the adhesive blend is approved by the U.S. FDA and the European Economic Community regulations regarding suitability for use in food packaging.

Composite structures of the invention, and particularly those of the structure LDPE/adhesive/EVOH/adhesive/HIPS find great utility in the fabrication of refrigerator liners and food packaging such as thermoformed cups, flexible sheets, cast or blown films, cast sheets, etc.

EXAMPLES

The following non-limiting examples are intended to illustrate the practice of the invention and comparison with other adhesive blends used in composite structures.

Example 1

As set forth in Table 1 below, a series of inventive adhesive blends designated A-I was prepared by mixing the identified components in the indicated proportions in a laboratory Brabender mixer. The Brabender process conditions included a shot weight of 40 g, a temperature of 420° F., mixer speed of 100 rpm, and mixing time of three minutes. The commercial source of each component is indicated in parentheses along with its trade designation.

Additionally, a comparative blend 1 comprising 25 wt. % Mobil 7100 impact-modified polystyrene, 67 wt. % Quantum UE 634-04 EVA, and 8 wt. % of a high density polyethylene homopolymer grafted with about 2 wt. % maleic anhydride was prepared under the same conditions.

A comparative blend 2 comprised DuPont BYNEL® E359 anhydride-modified ethylene vinyl acetate having a melt index of about 4.3 g/10 min. according to ASTM D-1238 (190° F., 2 16 g) This material is disclosed to be adhesive to polystyrenes, ethylene vinyl alcohol, and polyethylenes, is advertised to be well suited to structures such as polystyrene/adhesive/EVOH/adhesive/polyethylene.

All percentages are given in terms of weight.

TABLE 1

| MATERIAL | INVENTIVE COMPOSITIONS | | | | | | | | |
|---|---|---|---|---|---|---|---|---|---|
| | A | B | C | D | E | F | G | H | I |
| HIPS (Mobil 7100) | 25% | 20% | 20% | 30% | 30% | 35% | 30% | 50% | 22% |
| EVA (QUANTUM UE 634-04) | 67% | 68% | 72% | 64% | 62% | 57% | 58% | 42% | 68% |
| KRATON ® FG1901X | 8% | 12% | 8% | 6% | 8% | 8% | 12% | 8% | 10% |
| IRGANOX 1010 Antioxidant | 1000 PPM | 1000 PPM | 1000 PPM | 1000 PPM | 1000 PPM | 1000 PPM | 1000 PPM | 1000 PPM | 1000 PPM |

Each of the compositions was tested for heat seal adhesion strength using a Sentinel heat sealer with a 1 inch Seal bar width. Testing was conducted at 350° F., 400° F., and 450° F. (Heat seal data obtained at 400° F are generally considered to best correlate to results obtained under coextrusion conditions.)

Each adhesive was sealed against substrates of ethylene-vinyl alcohol copolymer (EVAL® F101 obtained from Kuraray), LDPE (Quantum NA 212), and HIPS (Mobil 7100). Adhesion was measured in terms of 180° T-peel adhesion strength in lb/in. Results are given in Table 2, below.

TABLE 2

| | HEAT SEAL ADHESION STRENGTH T-PEEL ADHESION STRENGTH (LB/INCH) | | | | | | | | |
|---|---|---|---|---|---|---|---|---|---|
| | 350° F. Heat Seal Temp. | | | 400° F. Heat Seal Temp. | | | 450° F. Heat Seal Temp. | | |
| Material | EVOH (EVAL F101) | LDPE (QUANTUM NA 212) | HIPS (MOBIL 7100) | EVOH (EVAL F101) | LDEP (QUANTUM NA 212) | HIPS (MOBIL 7100) | EVOH (EVAL F101) | LDPE (QUANTUM 212) | HIPS (MOBIL 7100) |
| A | 2.5 | 2.2 | 2.0 | 3.4 | 2.4 | 2.1 | 3.4 | 3.1 | 2.1 |
| B | 2.4 | 2.7 | 2.2 | 3.5 | 2.8 | 2.3 | 3.4 | 4.3 | 2.3 |
| C | 0.8 | 2.8 | 2.1 | 4.2 | 2.8 | 1.9 | 3.3 | 4.0 | 2.1 |
| D | 1.3 | 2.8 | 1.8 | 3.2 | 2.8 | 1.7 | 3.4 | 2.9 | 1.4 |
| E | 1.3 | 2.6 | 1.6 | 3.2 | 2.4 | 1.7 | 3.4 | 2.8 | 1.5 |
| F | 1.6 | 2.4 | 1.2 | 3.5 | 2.5 | 1.4 | 3.5 | 2.7 | 1.2 |
| G | 1.5 | 2.2 | 1.4 | 3.3 | 2.7 | 1.6 | 3.8 | 3.1 | 1.6 |
| H | 0.8 | 1.5 | 0.8 | 3.3 | 2.2 | 0.8 | 3.6 | 4.0 | 0.9 |
| I | 1.7 | 2.5 | 1.9 | 3.5 | 2.7 | 2.2 | 3.3 | 4.0 | 2.0 |
| 1 | 3.1 | 3.6 | 1.2 | 2.8 | 3.0 | 1.0 | 3.1 | 3.3 | 1.1 |
| 2 | 3.6 | 4.2 | 1.4 | 4.8 | 4.4 | 1.3 | 4.2 | 5.4 | 1.3 |

In composites comprising multiple diverse substrates, the overall adhesive strength of the composite structure is evaluated with respect to the weakest adhesion value present in the composite. A review of the foregoing reveals that the inventive adhesive blends give excellent adhesion to each of the three tested diverse substrates over a wide range of temperature and compositional characteristics.

Example 2

Table 3 below provides a summary of the compositions of three inventive blends J–L.

TABLE 3

| | INVENTIVE COMPOSITIONS | | |
|---|---|---|---|
| Material | J | K | L |
| HIPS (HUNTSMAN PS730) | 22% | 20% | |
| HIPS (BASF PS 4600) | | | 20% |

TABLE 3-continued

| | INVENTIVE COMPOSITIONS | | |
|---|---|---|---|
| Material | J | K | L |
| EVA (QUANTUM UE 634-09) | 68% | 68% | 68% |
| KRATON ® FG 1901X (SHELL) | 10% | 12% | 12% |
| IRGANOX 1010 Antioxidant | 1000 PPM | 1000 PPM | 1000 PPM |

Each of the inventive adhesives J–L and comparative adhesive 2 was coextruded with HIPS, EVOH, and LDPE into sheets having the structure shown below with thickness given in mils:

HIPS/ADHESIVE/EVOH/ADHESIVE/LDPE

| 54 | 0.75 | 1.5 | 0.75 | 4.0 | MIL |
|---|---|---|---|---|---|

Each sheet was tested for 90° and/or 180° T-peel adhesion strengths in the machine direction (MD) and transverse direction (TD) after five and 17 days using a sheet width of 1 inch and a T-peel speed of 10 inches per minute. Results are show in Table 4, below.

The sheets described above were formed into thermoformed cups of the structure shown below, with thickness given in mils:

HIPS/ADHESIVE/EVOH/ADHESIVE/LDPE

| 16.0 | 0.25 | 0.50 | 0.25 | 1.25 | MIL |

180° T-peel strength was tested after two days using ½ inch sample width and T-peel speed of 10 inches per minute. Results were shown in Table 4, below.

TABLE 4

COEXTRUSION ADHESION STRENGTH (LB/IN.)

| Material | COEXTRUDED SHEET (MD) | COEXTRUDED SHEET (TD) | THERMOFORMED CUP |
|---|---|---|---|
| J | 3.4 5 DAYS HIPS SEPARATION | 3.2 5 DAYS HIPS SEPARATION | 0.9 2 DAYS HIPS SEPARATION |
|  | 3.2 17 DAYS HIPS SEPARATION | 4.3 17 DAYS HIPS SEPARATION |  |
|  | 5.5 17 DAYS | 6.2 17 DAYS |  |
| 90 DEGREE T-PEEL | HIPS SEPARATION | HIPS SEPARATION |  |
| K | 2.7 5 DAYS HIPS SEPARATION | 4.0 5 DAYS HIPS SEPARATION | 0.9 2 DAYS HIPS SEPARATION |
| L | 3.1 5 DAYS HIPS SEPARATION | 3.2 5 DAYS HIPS SEPARATION | 0.8 2 DAYS HIPS SEPARATION |
| 2 | 6.3 C 5 DAYS EVOH SEPARATION | 2.8 5 DAYS HIPS SEPARATION | 0.8 C 2 DAYS HIPS SEPARATION |
|  | 6.2 C 17 DAYS EVOH SEPARATION | 2.7 17 DAYS HIPS SEPARATION |  |
|  | 7.9 C 17 DAYS | 3.8 17 DAYS |  |
| 90 DEGREE T-PEEL | EVOH SEPARATION | HIPS SEPARATION |  |

C = COHESIVE FAILURE OF ADHESIVE DURING T-PEEL

In each of the inventive and comparative blends, no elongation strings appeared during thermoforming.

The results shown in Table 4 illustrate that the inventive blends are characterized by uniform adhesion values in both the machine direction and the transverse direction in finished thermoformed products. Adhesion values at least as high as three of the comparison materials were maintained during thermoforming, despite higher initial adhesion in one direction in the comparative blend. Therefore, the foregoing demonstrates the capability of blends of the invention to avoid or minimize loss of both 90° and 180° T-peel adhesion strength under thermoforming conditions.

The foregoing detailed description is given for clearness of understanding only, and no unnecessary limitations should be understood therefrom, as modifications within the scope of the invention may be apparent to those skilled in the art.

I claim:

1. An adhesive blend, consisting of a mixture of:
   (a) about 60 wt. % to about 80 wt. % of an ethylene/ester copolymer selected from the group consisting of ethylene/vinyl acetate copolymers and ethylene/acrylate copolymers;
   (b) about 20 wt. % to about 40 wt. % of an impact-modified polystyrene having a melt index according to ASTM D-1,238, Condition G in the range of about 0.5 g/10 min to about 12 g/10 min;
   (c) about 4 wt % to about 16 wt. % of a styrene-ethylene/butylene-styrene (SEBS) block copolymer grafted with about 0.02 wt. % to about 20 wt. % of an ethylenically unsaturated carboxylic acid or anhydride grafting monomer; and
   (d) optionally, an antioxidant.

2. The adhesive blend of claim 1 wherein said ethylene/ester copolymer is an ethylene/vinyl acetate copolymer having a vinyl acetate content in the range of about 5 wt. % to about 40 wt. %.

3. The adhesive blend of claim 1 wherein said impact-modified polystyrene has a notched Izod impact value at 73° F. according to ASTM D-256 of greater than about 0.5 ft-lb/in.

4. The adhesive blend of claim 3 wherein said notched Izod impact value is greater than about 1.5 ft.-lb/in.

5. The adhesive blend of claim 1 wherein said grafting monomer comprises about 0.1 wt. % to about 10 wt. % of said functionalized SEBS block copolymer of (c).

6. The adhesive blend of claim 5 wherein said bound grafting monomer comprises about 0.2 wt. % to about 5 wt. % of said grafted SEBS block copolymer of (c).

7. The adhesive blend of claim 1 wherein said grafting monomer is maleic anhydride.

8. The adhesive blend of claim 7 wherein said grafted SEBS block copolymer has a styrene-to-rubber weight ratio of about 28:72 and comprises about 2 wt. % grafted maleic anhydride.

9. The adhesive blend of claim 1 wherein said copolymer of (a) is an ethylene/vinyl acetate copolymer having a vinyl acetate content or 28 wt. % and comprises about 68 wt. of said blend, said impact-modified polystyrene of (b) is high impact polystyrene (HIPS) and comprises about 20 wt. % of said blend, and said functionalized SEBS block copolymer of (c) comprises about 10 wt. % of said blend.

10. The adhesive blend of claim 9 wherein said grafted SEBS block copolymer of (c) has a styrene-to-rubber weight ratio of about 28:72 and comprises about 2 wt. % grafted maleic anhydride.

* * * * *

UNITED STATES PATENT AND TRADEMARK OFFICE
CERTIFICATE OF CORRECTION

PATENT NO. : 5,597,865
DATED : Jan. 28, 1997
INVENTOR(S) : Paul H. Jackson

It is certified that error appears in the above-indentified patent and that said Letters Patent is hereby corrected as shown below:

Column 7, line 58, "D-1,238" should read --D-1238--.

Column 8, line 40, "functionalized" should read --grafted--.
line 41, delete "bound".
line 52, "or" should read --of--.
line 55, "20" should read --22--.

Signed and Sealed this

Fifteenth Day of July, 1997

Attest:

BRUCE LEHMAN

Attesting Officer

Commissioner of Patents and Trademarks